Patented Jan. 17, 1939

2,144,577

UNITED STATES PATENT OFFICE 2,144,577

TITANIUM DIOXIDE PIGMENTS

Karl Walter Petersen, Krefeld-Uerdingen, Germany, assignor to I. G. Farbenindustrie Aktiengesellschaft, Frankfort-on-the-Main, Germany No Drawing. Application July 26, 1935, Serial No. 33,383. In Germany August 7, 1934

19 Claims. (Cl. 134—58)

This invention relates to the manufacture of titanium dioxide pigments possessing improved properties. The process of the invention comprises incorporating difficultly soluble metallic fluorides with a white titanium pigment, such as titanium dioxide and composite pigments thereof.

An object of the present invention is the production of improved titanium dioxide pigments which are especially distinguished by the light resistance of coatings produced therefrom, by a considerably improved behaviour to weathering and by the fact that organic dyestuffs when exposed to light in the presence of such white titanium pigments are less inclined to bleach. Another object is to provide improved methods for incorporating difficultly soluble metallic fluorides with white titanium dioxide pigments.

Among the difficultly soluble metallic fluorides suitable as additions to the white titanium pigments the difficultly soluble fluorides of lithium, lead, lanthanium, cerium and zinc may be mentioned, especially good results being obtained with the difficultly soluble fluorine compounds of metals of the third group of the periodic system such as aluminium, scandium, yttrium as well as alkaline-earth metal, such as magnesium, strontium and particularly barium. By the term "difficultly soluble" as descriptive of the metallic fluorides useful in the practice of my invention I mean, of course, difficultly soluble in water and aqueous media generally.

These fluorides can be incorporated with the titanium dioxide pigment, for example with practically pure dioxide or composite pigments thereof before or after calcination in the customary manner, as for example in a ball-mill. Particularly good results are obtained when the addition to the titanium pigment takes place in such a manner, that the pigment particles are covered over or coated with the difficultly soluble metallic fluoride. This can be accomplished most simply by precipitating the fluoride on the titanium pigment, for example, in an aqueous medium by means of a reaction between a fluoride-forming fluorine compound such as a water-soluble fluoride and a salt of a metal which constitutes with fluorine the difficultly soluble metallic fluoride in the manner of Examples 1 and 3. The process can likewise be carried out in such a manner that a complex fluoride of the desired metal, such as for example, an alkaline-earth metal salt of hydrofluosilicic acid, hydrofluoboric acid, hydrofluotitanic acid and hydrofluoarsenic acid is added to the pigment and then the said compound is converted into the corresponding fluoride by heating the mixture to the decomposition point of the complex fluoride, for example, by mixing the white titanium dioxide pigment in an aqueous medium with the complex fluo-acid, forming the desired complex metal fluoride, in situ, by adding a water-soluble hydroxide of a metal the fluoride of which is difficultly soluble in water, washing the resulting precipitate and then heating it, in the manner of Example 2.

By the term "complex metal fluoride" or "complex metallic fluoride", as used in this description of my invention and in the claims appended hereto I mean to include those fluorine containing compounds of metals the electro-negative constituent of which appears to consist of fluorine and an amphoteric element acting together as a radical. Such compounds are sometimes referred to as "double fluorides". By "complex fluo-acid" I means to designate those acids from which theoretically complex metal fluorides are derived. (cf. Mellor. Treatise on Inorganic and Theoretical Chemistry, vol. II, 1927, p. 133 and p. 140.)

In order to obtain the desired effect it is in general sufficient to include a comparatively small quantity of the fluoride. Thus for example an addition of about 2% of barium fluoride to titanium dioxide produces a pronounced improvement of the pigment properties mentioned above, the best results being obtained by an addition of about 20 to about 30% by weight of barium fluoride, calculated on the titanium dioxide pigment. In general the upper limit of the metallic fluoride should not exceed 50% by weight of the titanium dioxide pigment employed, a greater amount considerably diminishing the covering power of the pigment.

The white titanium pigments obtainable in accordance with the process of my invention can find application as such or compounded in the known manner with the usual extenders, such as barium sulphate (if they do not already contain this material) zinc oxide and the like.

The following examples illustrate the invention; the parts being by weight.

Example 1

10 parts by weight of titanium dioxide are stirred into a paste with 5 parts by weight of an aqueous solution containing 4 parts by weight of crystallized magnesium chloride. This paste is stirred into 100 parts by weight of an aqueous solution containing 2 parts by weight of ammonium fluoride and 1 part by weight of ammonia.

Stirring is continued for about ½ hour, the pigment is allowed to settle, filtered, washed and dried at 200° C.

*Example 2*

10 parts by weight of titanium dioxide are stirred into a paste with 5 parts by weight of 40% hydrofluosilicic acid. This paste is introduced into 160 parts by weight of an aqueous solution of 10 parts by weight of crystalline barium hydroxide. The mixture is stirred for about ½ hour, allowed to settle, filtered, the precipitate is washed several times with water and finally with water containing carbon dioxide to convert the last traces of adhering barium hydroxide to barium carbonate. The residue is then ignited at 600° C.

*Example 3*

10 parts by weight of titanium dioxide are stirred into a paste with 5 parts by weight of an aqueous solution containing 4 parts by weight of pure crystallized aluminium chloride. This paste is stirred into 100 parts by weight of an aqueous solution containing 4 parts by weight of ammonium fluoride and 1 part by weight of ammonia. Stirring is continued for about ½ hour, the pigment is allowed to settle, filtered, washed and dried at 200° C.

I claim:

1. Process which comprises stirring 10 parts by weight of titanium dioxide into a paste with 5 parts by weight of an aqueous solution containing 4 parts by weight of crystallized magnesium chloride, stirring this paste into 100 parts by weight of an aqueous solution containing 2 parts by weight of ammonium fluoride and 1 part by weight of ammonia, continuing stirring for about ½ hour, allowing the pigment to settle, filtering, washing and drying at 200° C.

2. Process which comprises stirring 10 parts by weight of titanium dioxide into a paste with 5 parts by weight of 40% hydrofluosilicic acid, introducing this paste into 160 parts by weight of an aqueous solution of 10 parts by weight of crystalline barium hydroxide, stirring the mixture for ½ hour, allowing the precipitate to settle, filtering, washing the precipitate several times with water and finally with water containing carbon dioxide and igniting the residue at 600° C.

3. Process which comprises stirring 10 parts by weight of titanium dioxide into a paste with 5 parts by weight of an aqueous solution containing 4 parts by weight of crystallized aluminium chloride, stirring this paste into 100 parts by weight of an aqueous solution containing 4 parts by weight of ammonium fluoride and 1 part by weight of ammonia, continuing stirring for ½ hour, allowing the pigment to settle, filtering, washing and drying at 200° C.

4. A pigment comprising particles of titanium dioxide coated with aluminium fluoride, the amount of said fluoride being between 2% and 50% by weight of the said titanium dioxide.

5. A pigment comprising particles of titanium dioxide coated with aluminium fluoride in an amount equal to about 6% of the weight of said titanium dioxide particles.

6. A pigment comprising particles of titanium dioxide coated with an alkaline-earth metal fluoride in an amount between 2% to 50% by weight of the said titanium dioxide.

7. A pigment comprising particles of titanium dioxide coated with magnesium fluoride, the amount of said fluoride being between 2% and 50% by weight of the said titanium dioxide.

8. Process for the manufacture of improved white titanium dioxide pigments which comprises precipitating on a white titanium dioxide pigment a metallic fluoride which is difficultly soluble in water in an amount between 2% and 50% by weight of the said titanium pigment.

9. Process for the manufacture of improved white titanium dioxide pigments which comprises precipitating a metallic fluoride which is difficultly soluble in water on a white titanium dioxide pigment in an aqueous medium by means of a reaction between a water-soluble fluoride and a water-soluble salt of a metal the fluoride of which is difficultly soluble in water, the quantities of soluble fluoride and metallic salt being so controlled that the amount of said metallic fluoride precipitated on the titanium pigment is between about 2% to 50% by weight of said titanium pigment.

10. Process for the manufacture of improved white titanium dioxide pigments which comprises stirring a white titanium dioxide pigment with water in the presence of a water-soluble salt of a metal the fluoride of which is difficultly soluble in water to form a paste, mixing therewith an aqueous solution of a water soluble fluoride, the quantities of water-soluble fluoride and water-soluble metallic salt being so controlled that the amount of difficultly soluble metallic fluoride formed will be between 2% to 50% by weight of the said titanium pigment.

11. A pigment comprising particles of titanium dioxide coated with a difficultly soluble simple metal fluoride compound to impart to said particles of titanium dioxide improved weather-resistant properties and a reduced tendency to bleach organic dyestuffs, said simple metal fluoride being present in an amount between 2% and 20% by weight of the said titanium dioxide.

12. A pigment comprising particles of titanium dioxide and precipitated thereon an alkaline earth metal fluoride the amount of said fluoride being between 2% and 50% by weight of the said titanium dioxide to impart thereto improved weather-resisting properties and a reduced tendency to bleach organic dyestuffs.

13. Process which comprises forming a mixture of a complex fluoride of an alkaline-earth metal and a titanium dioxide pigment in an amount between 2% and 50% by weight of the said titanium dioxide pigment and converting the complex fluoride into the corresponding simple fluoride of the said alkaline-earth metal by heating the mixture.

14. A pigment comprising particles of titanium dioxide coated with a fluoride of a metal of the third group of the periodic system, the amount of said fluoride being between 2% and 50% by weight of the said titanium dioxide.

15. A pigment comprising particles of titanium dioxide coated with magnesium fluoride in an amount equal to about 20% of the weight of the said titanium dioxide particles.

16. A pigment comprising particles of titanium dioxide coated with barium fluoride in an amount between 2% and 50% by weight of the said titanium dioxide particles.

17. Process for the manufacture of improved white titanium dioxide pigments which comprises incorporating a metal fluoride which is difficultly soluble in water with a titanium dioxide pigment in an aqueous medium by means of a reaction between a water-soluble complex fluo-acid and a water-soluble hydroxide of a metal the fluoride of which is difficulty soluble in water and subjecting the resulting mixture of titanium dioxide pigment and metal salt of the complex fluo-acid to a temperature above the decomposition point of the said complex metal fluoride, the quantities of said complex fluo-acid and metal hydroxide being so controlled that the amount of said metal fluoride in the final product will be between 2% and 50% by weight of the said titanium dioxide pigment.

18. Process for the manufacture of improved white titanium dioxide pigments which comprises stirring a white titanium dioxide pigment with water in the presence of a complex fluo-acid to form a paste mixing therewith a water-soluble hydroxide of a metal the fluoride of which is difficultly soluble in water and subjecting the resulting mixture of titanium dioxide pigment and difficultly soluble complex metal fluoride to a temperature above the decomposition point of said difficultly soluble complex metal fluoride, the quantities of said complex fluo-acid and water-soluble metal hydroxide being so controlled that the amount of said metal fluoride formed will be between 2% and 50% by weight of the said titanium dioxide pigment.

19. A pigment comprising particles of a white titanium dioxide pigment and precipitated thereon a metal fluoride which is difficultly soluble in water in an amount between 2% and 50% by weight of the said titanium dioxide pigment to impart to said pigment improved weather-resisting properties and a reduced tendency to bleach organic dyestuffs.

KARL WALTER PETERSEN.